(12) United States Patent
Jalil

(10) Patent No.: US 8,705,369 B2
(45) Date of Patent: Apr. 22, 2014

(54) ROUTING COST NORMALIZING

(75) Inventor: Luay Jalil, Allen, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 476 days.

(21) Appl. No.: 13/097,113

(22) Filed: Apr. 29, 2011

(65) Prior Publication Data

US 2012/0275309 A1 Nov. 1, 2012

(51) Int. Cl.
G01R 31/08 (2006.01)
G06F 11/00 (2006.01)
G08C 15/00 (2006.01)

(52) U.S. Cl.
USPC .......................................................... 370/238

(58) Field of Classification Search
USPC .......................................................... 370/238
See application file for complete search history.

(56) References Cited

U.S. PATENT DOCUMENTS

| 2004/0098503 | A1* | 5/2004 | Zhang et al. | 709/238 |
| 2005/0094630 | A1* | 5/2005 | Valdevit | 370/360 |
| 2005/0228931 | A1* | 10/2005 | Broyles | 710/307 |
| 2006/0171344 | A1* | 8/2006 | Subramanian et al. | 370/315 |
| 2009/0003367 | A1* | 1/2009 | Hei et al. | 370/408 |
| 2009/0232030 | A1* | 9/2009 | Suzuki et al. | 370/256 |
| 2009/0287408 | A1* | 11/2009 | Gerdes et al. | 701/202 |
| 2010/0027427 | A1* | 2/2010 | Kokje et al. | 370/238 |
| 2010/0054146 | A1* | 3/2010 | Rudland et al. | 370/252 |

* cited by examiner

Primary Examiner — Farah Faroul

(57) ABSTRACT

A computing device ranks multiple routing pairs based on a current routing configuration for weighted links in a network, and ranks the multiple routing pairs based on a proposed routing configuration, different than the current routing configuration, for the weighted links in the network. The computing device compares a current rank order of a first routing pair and a second routing pair in the multiple routing pairs with a proposed rank order of the first routing pair and the second routing pair. The computing device identifies a change between the current rank order and the proposed rank order and generates a data structure that indicates the identified change between the current rank order and the proposed rank order for the first routing pair and the second routing pair.

20 Claims, 11 Drawing Sheets

| RANK 410 | "FROM" NODE 420 | "TO" NODE 430 | COST 440 | DELAY 450 | "TO" CITY 460 | "TO" STATE 470 | "TO" COUNTRY 480 | "TO" REGION 490 |
|---|---|---|---|---|---|---|---|---|
| 1 | AABB01 | AABB02 | 9800 | 60 | St. Louis | MO | US | NORAM |
| 2 | AABB01 | AABB04 | 9900 | 80 | Phoenix | AZ | US | NORAM |
| 3 | AABB01 | AABB05 | 9950 | 190 | New York | NY | US | NORAM |
| 4 | AABB01 | AABB03 | 9958 | 260 | San Jose | N/A | Costa Rica | LATAM |

FIG. 4

| RANK STATUS 505 | "FROM" NODE 420 | "TO" NODE 430 | RANK AFTER 510 | RANK BEFORE 515 | COST AFTER 520 | DELAY 450 | P4-"TO" CITY 525 |
|---|---|---|---|---|---|---|---|
| OK | AABB01 | AABB02 | 1 | 1 | 9452 | 60 | St. Louis |
| FLAG | AABB01 | AABB04 | 2 | 3 | 9560 | 190 | New York |
| FLAG | AABB01 | AABB05 | 3 | 4 | 9958 | 260 | San Jose |
| FLAG | AABB01 | AABB03 | 4 | 2 | 9960 | 80 | Phoenix |

| P3-"TO" STATE | P2-"TO" COUNTRY | P1-"TO" REGION | RECOMMENDATION |
|---|---|---|---|
| MO | US | NORAM | N/A |
| NY | US | NORAM | AABB01-XXYY07:Delay FLAG diff. 43: P2: -1$^{st}$ or +2$^{nd}$ 269 |
| N/A | Costa Rica | LATAM | AABB01-XXYY06:Delay FLAG diff. 18: P1: -1$^{st}$ or +2$^{nd}$ 429 |
| AZ | US | NORAM | AABB01-XXYY02:Delay FLAG diff. 35: P3: -1$^{st}$ or +2$^{nd}$ 59 |

FIG. 5B

ROUTING COST NORMALIZING

BACKGROUND

Interior Gateway Protocol (IGP) networks, such as those implementing Open Shortest Path First (OSPF) or Intermediate System to Intermediate System (IS-IS), determine a best path for routing between nodes. Weights may be applied to links in a traffic matrix of an applicable network portion, and devices within the network may calculate a best path based in part on the cumulative costs of a routing path.

In a Private Internet Protocol (PIP) network, for example, network engineers may change costs or metrics of routing paths to achieve better network performance (e.g., to improve latency). However, these changes may affect the priority of routing pairs in the PIP network. When the priority of a routing pair changes, a customer's route preferences can be impacted. For example, customer route preferences may seek to keep traffic within a particular geographic region (e.g., a particular region, country, continent, etc.). Changes to link costs/metrics (e.g., intended to improve latency) may adversely affect the network's ability to meet the customer route preferences.

BRIEF DESCRIPTION OF THE DRAWINGS

FIG. 4 depicts a portion of a data structure that is capable of being generated/used by a ranking module of FIG. 3;

FIG. 5A-5C depict a portion of a data structure that is capable of being generated by a report generator of FIG. 3.

DETAILED DESCRIPTION

The following detailed description refers to the accompanying drawings. The same reference numbers in different drawings may identify the same or similar elements.

Systems and/or methods described herein may relate to adjusting costs/metrics of weighted network links in a network while providing information to maintain customer route preferences. In one implementation, a computing device may receive an original (or first) routing information file that includes current weights for multiple routing pairs in the network and a proposed (or second) routing information file that includes proposed new weights for the multiple routing pairs in the network. The computing device may rank the routing pairs in the original routing information file and the routing pairs in the proposed information file based on the same criteria. For any two routing pairs, the computing device may compare the respective rank orders between the original routing information and the proposed routing information. The computing device may identify a change in the rank orders and generate a data structure that indicates the change in the rank order. The system and/or methods may also assign priorities to identified changes in rank orders, may perform a check to confirm latency improvements in the proposed routing information file, and/or may calculate changes to the proposed routing pair costs to maintain the rank order (e.g., respective to the two routing pairs) of the original routing information file.

Figure 1:
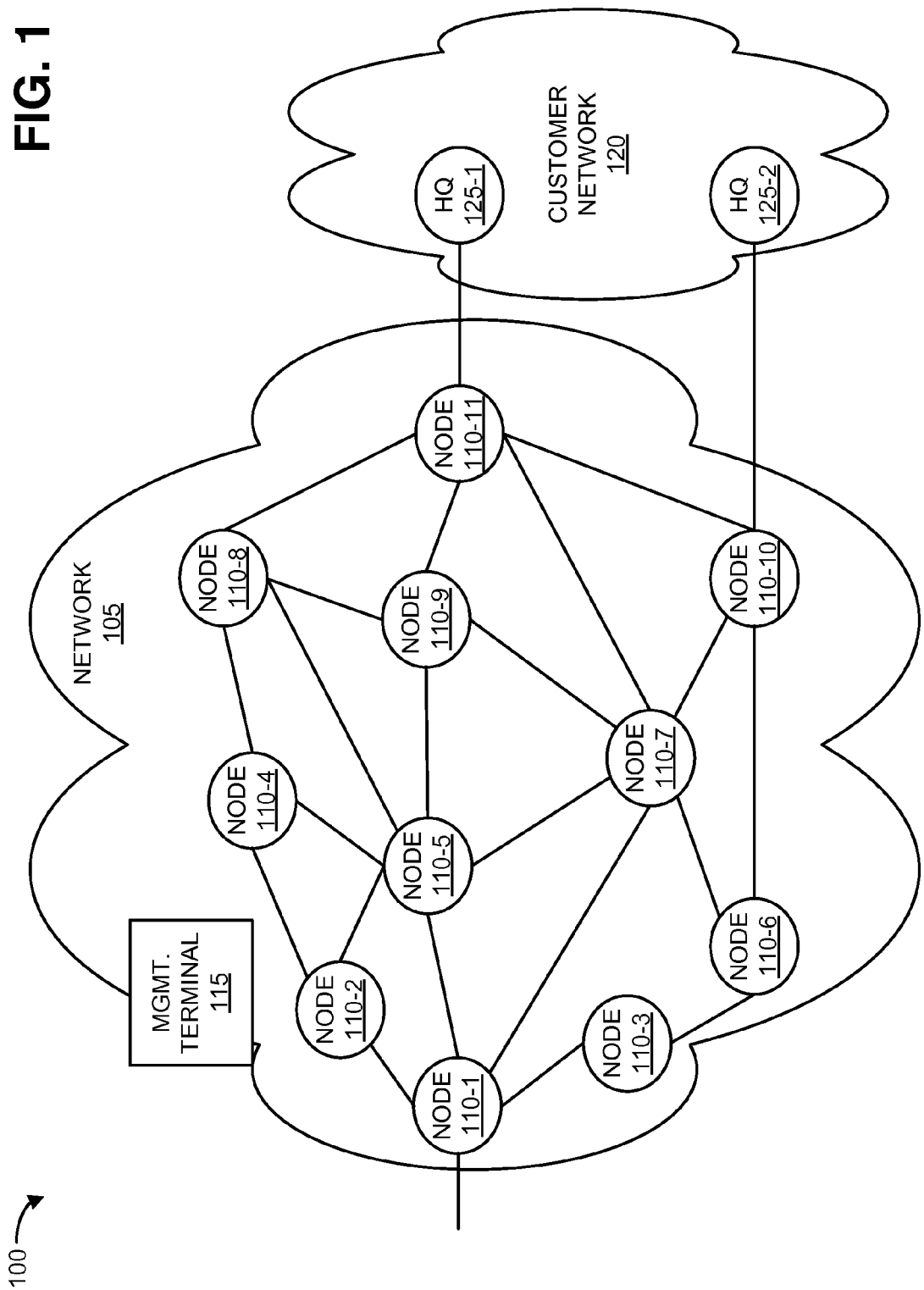
FIG. 1 is a diagram of an exemplary network in which concepts described herein may be implemented.

FIG. 1 is a diagram of an exemplary network 100 in which systems and/or methods, described herein, may be implemented. As shown in FIG. 1, network 100 may include a core network 105 and a customer network 120. Core network 105 may include nodes 110-1, 110-2, . . . , 110-11 (referred to collectively as "nodes 110," and individually as "node 110") and a management terminal 115. Nodes 110 may connect via a number of network links. The network links may be wired or wireless links.

Core network 105 may include and Internet Protocol network or a multiprotocol label switching (MPLS) network implement an Interior Gateway Protocol (IGP), such as Open Shortest Path First (OSPF), Intermediate System to Intermediate System (IS-IS), or another protocol that assigns weights to links between nodes. Each node 110 in core network 105 may implement a minimum cost end-to-end path for routing between nodes.

Node 110 may include a device that transmits and/or receives traffic. Node 110 may take the form of a routing device, a switching device, a multiplexing device, or a device that performs routing, switching, and/or multiplexing functions. In one implementation, node 110 may be a digital device. In another implementation, node 110 may be an optical device. In yet another implementation, node 110 may be a combination of a digital device and an optical device.

Each node 110 may connect to one or more other nodes 110. In one implementation, nodes 110 may be connected via digital channels (e.g., time-division multiplexing (TDM) channels) or optical channels (e.g., wave division multiplexed channels) and may collectively form an IP or MPLS network (e.g., core network 105). Nodes 110 may exchange routing information with each other, for example, through Internal Gateway Protocol (IGP) and with nodes in other networks (e.g., customer network 120 and/or other networks, not shown) through External Border Gateway Protocol (EBGP).

Network 105 may include devices and/or systems for providing services, such as a Private IP (PIP) network service for voicemail, call blocking, calling card, audio and net conferencing, etc. In some implementations, network 105 may provide redundancy and/or the ability to distribute network load. As shown in FIG. 1, certain nodes 110 in network 100 may function as Provider Edge (PE) routers, such as nodes 110-1, 110-10, and 110-11. PE routers may include routers that provide an entry and/or an exit to and from network 105. Other nodes 110 in network 105 may include routers that accept, for example, IP/MPLS packets and route them toward their destinations (e.g., a customer edge router or another customer device in customer network 120). Generally, nodes in network 105 may include routing logic to select a best path for traffic traversing network 105 to, for example, customer network 120.

Management terminal 115 may include one or more computation or communication devices that gather, process, search, and/or provide information in a manner described herein. For example, management terminal 115 may include a laptop computer, a personal computer, a tablet computer, a workstation, or another type of computation or communication devices. In one implementation, management terminal 115 may be integrated with a network management system or another operations support system (OSS) that allows remote management of network assets across a network infrastructure, such as network 105. Management terminal 115 may receive cost and/or metric information for links within network 100. For example, management terminal 115 may receive configuration files from nodes 110 through a network connection, a manual transfer, or another file transfer mechanism. Once the cost and/or metric information is received, management terminal 115 may analyze the configuration files independent of any connection with network 100. In implementations described herein, management terminal 115 may use the cost and/or metric information to perform routing cost normalization analysis, as described further herein.

Customer network 120 may include a local area network (LAN), a wide area network (WAN), a metropolitan area network (MAN), an optical fiber (or fiber optic)-based network, or a combination of networks. In one implementation, customer network 120 may include multiple headquarter (HQ) nodes 125-1 and 125-2 for backup and/or load sharing purposes. Customer network 120 may receive network traffic at either of headquarter 125-1 or headquarter 125-2, however, customer network 120 may have route preferences. For example, customers of customer network 120 may have preferences to maintain traffic within particular geographic boundaries (e.g., local, state, and/or national boundaries).

In implementations described herein, network engineers may propose cost/weight changes to links between routing pairs (e.g., between nodes 110-1 and 110-11 or between nodes 110-1 and 110-10) in network 105 (e.g., to achieve better performance). Management terminal 115 may receive network information including the original costs/weights and the proposed costs/weights for network 105 and may determine if the proposed changes will affect the priority of routing pairs in the network 105. When the priority of routing pairs would be affected, management terminal 115 may prioritize the detected changes (e.g., based on a magnitude of geographic change) and may provide recommendations to alter the proposed cost/weight changes to maintain the original routing pair priority.

Although, FIG. 1 illustrates exemplary components of environment 100, in other implementations, environment 100 may include additional, fewer, different, or differently arranged components than those illustrated in FIG. 1 and described herein.

Figure 2:
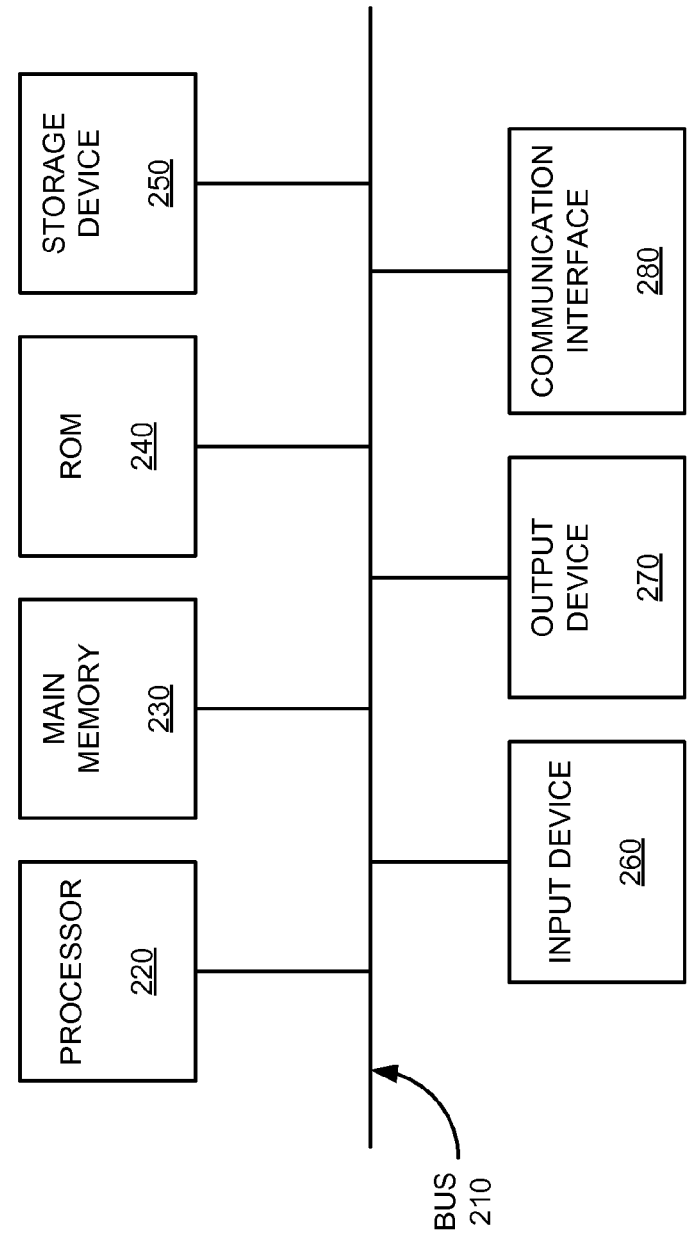
FIG. 2 is a diagram illustrating exemplary components of a management terminal of FIG. 1.

FIG. 2 is a diagram of exemplary components of a management terminal 115. As illustrated, management terminal 115 may include a bus 210, a processing unit 220, a main memory 230, a read-only memory (ROM) 240, a storage device 250, an input device 260, an output device 270, and a communication interface 280. Bus 210 may include a path that permits communication among the components of management terminal 115.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to management terminal 115, such as remote control 140, control buttons, a keyboard, a mouse, a pen, a microphone, voice recognition and/or biometric mechanisms, a touch screen, etc. Output device 270 may include a mechanism that outputs information to the operator, including a display, an indicator light, a speaker, etc. Communication interface 280 may include any transceiver-like mechanism that enables management terminal 115 to communicate with other devices and/or systems. For example, communication interface 280 may include mechanisms for communicating with another device or system via a network.

As described herein, management terminal 115 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of management terminal 115, in other implementations, management terminal 115 may contain fewer components, different components, differently arranged components, or additional components than depicted in FIG. 2. In still other implementations, one or more components of management terminal 115 may perform one or more other tasks described as being performed by one or more other components of management terminal 115.

Figure 3:
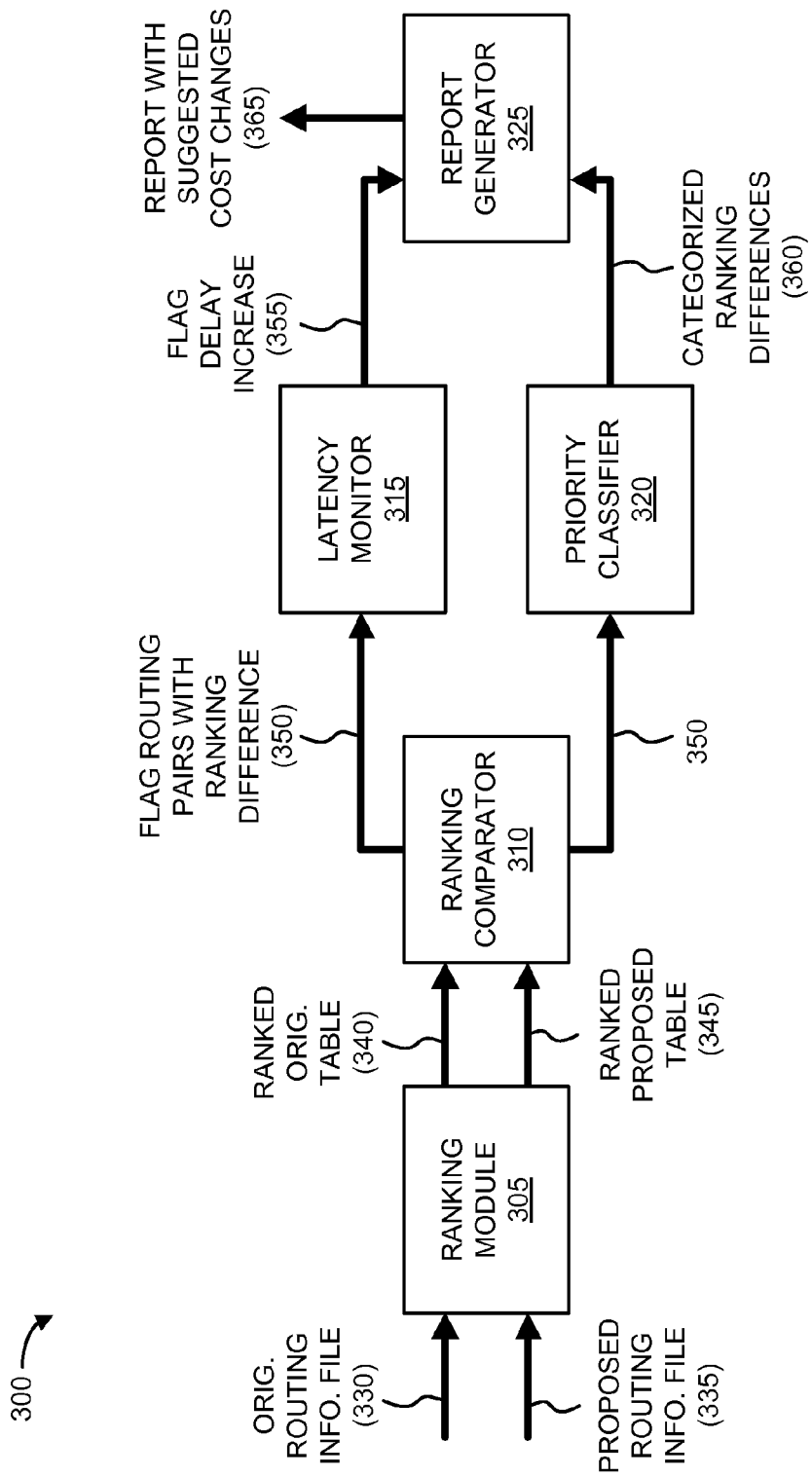
FIG. 3 is a diagram illustrating communications between functional components of the management terminal of FIG. 1.

FIG. 3 is a block diagram of example functional components of management terminal 115. In one implementation, the functions described in connection with FIG. 3 may be performed by processor 220 (FIG. 2). In another implementation, the functions described in connection with FIG. 3 may be performed by processor 220 in conjunction with communication interface 280. As illustrated, management terminal 115 may include a ranking module 305, a ranking comparator 310, a latency monitor 315, a priority classifier 320, and a report generator 325.

Generally, management terminal 115 may compare routing information from an existing (or original) network configuration with routing information for a proposed network engineering cost change. Management terminal 115 may use the comparison to identify changes in routing pair priorities (e.g., that could impact customer service) and to verify latency improvements.

Ranking module 305 may include hardware or a combination of hardware and software to receive and sort routing information for routing pairs. For example, ranking module 305 may receive routing information file 330 for an original network configuration (e.g., with current edge node-to-edge node costs) and routing information file 335 for a proposed configuration (e.g., with new edge node-to-edge node costs). Routing information files 330/335 may include data from routing tables and other network modeling information that can be used to evaluate network performance. For example, routing information files 330/335 may include assigned costs, delay times, and geographic information associated with each routing pair in network 105. Routing information files 330/335 may be automatically generated by network management software, manually assembled from various sources, or otherwise generated.

Ranking module 305 may separately sort and rank routing pairs within each of routing information file 330 and routing information file 335. For example, ranking module 305 may identify and/or extract relevant fields from routing information file 330, sort the routing pairs based on particular criteria, and rank each routing pair of the sorted routing table information 330. The sorted, ranked routing pairs from routing information file 330 may be provided to ranking comparator 310 as ranked original table 340. Similarly, ranking module 305 may identify and/or extract relevant fields from routing information file 335, sort the routing pairs based on the same particular criteria used for routing information file 330, and rank each routing pair of the sorted routing information file 335. The sorted, ranked routing pairs from routing information file 335 may be provided to ranking comparator 310 as ranked proposed table 345.

Operations of ranking module 305 are described further in connection with FIG. 4. FIG. 4 depicts a portion of a data structure 400 that is capable of being generated/used by ranking module 305. Data structure 400 may correspond to either of ranked original table 340 or proposed table 345. As shown in FIG. 4, data structure 400 may include a rank field 410, a "from" node field 420, a "to" node 430, a cost field 440, a delay field 450, a "to" city field 460, a "to" state field 470, a "to" country field 480, a "to" region field 490, and a variety of records or entries 495 associated with fields 410-490. Each row of data structure 400 may correspond to a separate routing pair within network 105.

Rank field 410 may include an ordinal rank of a routing pair defined in corresponding fields 420 and 430. Values in rank field 410 may be applied after sorting of entries in fields 420-490, described further below, is complete.

"From" node field 420 may include a name of a sending edge node (e.g., "AABB01") in a routing pair. "To" node field 430 may include a name of a recipient edge node (e.g., AABB02") in the routing pair. Cost field 440 may be a numerical weight value, assigned, for example, by a network engineer, for a corresponding routing pair (e.g., "9800"). When data structure 400 corresponds to ranked original table 340, cost field 440 may include a current (e.g., original) cost/metric for the corresponding routing pair. When data structure 400 corresponds to ranked proposed table 345, cost field 440 may include a proposed cost/metric for the corresponding routing pair.

Delay field 450 may include a calculated time value (e.g., in milliseconds) for a signal to traverse from one node (e.g., in "from" node field 420) to another node (e.g., in "to" node field 430) of a routing pair. Calculated values for delay field 450 may for example, account for a distance between nodes (and other factors) in the corresponding routing pair.

"To" city field 460 may include a city (e.g., "St. Louis) associated with the geographic location of a corresponding edge node (e.g., in "to" node field 430) of a routing pair. "To" state field 470 may include a state (e.g., "MO") associated with the geographic location of a corresponding node (e.g., in "to" node field 430) of a routing pair. "To" country field 480 may include a country (e.g., "US") associated with the geographic location of a corresponding node (e.g., in "to" node field 430) of a routing pair. "To" region field 490 may include a region (e.g., "NORAM") associated with the geographic location of a corresponding node (e.g., in "to" node field 430) of a routing pair. In implementations, herein a region may correspond to larger geographic area than a country. For example, a region may include a continent (e.g., North America), a portion of a continent (e.g., Western Europe), or another geographical area. Entries in "to" city field 460, "to" state field 470, "to" country field 480, and/or "to" region field 490 may include a full names or abbreviations. Additionally, or alternatively, other geographic indicators for node locations may be used.

Although FIG. 4 shows example information that may be provided in data structure 400, in other implementations, data structure 400 may contain less, different, differently arranged, or additional information than depicted in FIG. 4. For example, data structure 400 may take the form of a spreadsheet, a database, a flat data structure, etc.

Referring collectively to FIGS. 3 and 4, in implementations herein, ranking module 305 may apply particular ranking/sorting actions to original routing information file 330 and proposed routing information file 335 to permit meaningful comparisons. For example, in original routing information file 330, ranking module 305 may sort routing pairs (e.g., as identified in "from" node field 420 and "to" node field 430) alphabetically (e.g., from A to Z) by entries in "from" node field 420. Ranking module 305 may then sort the routing pairs numerically (e.g., from smallest to largest value) by entries in cost field 440. Ranking module 305 may next sort the routing pairs alphabetically (e.g., from A to Z) by entries in "to" node field 430. After sorting, ranking module 305 may assign a rank value (e.g., in rank field 410) for each corresponding routing pair. The sorted, ranked data may be stored (e.g., in memory 230 or storage 250) as ranked original table 340.

Ranking module 305 may perform identical sorting/ranking steps (e.g., to those used to generate ranked original table 340) on proposed routing information file 335 to generate ranked proposed table 345. While particular sorting/ranking steps have been described herein, in other implementations, different sorting steps may be used (e.g., consistently between original routing information file 330 and proposed routing information file 335) to generate ranked original table 340 and ranked proposed table 345.

Ranking comparator 310 may include hardware or a combination of hardware and software to identify changes between rankings of routing pairs. For example, ranking comparator 310 may compare a first path between a particular "from" node (e.g., node 110-1) and a particular "to" node (e.g., node 110-11) to second path between the same "from" node and a different "to" node (e.g., node 110-11). Ranking comparator 310 may determine if the ranking of the first path and the ranking of the second path are in the same relative order before and after the proposed cost changes (e.g., based on a comparison of ranked original table 340 and ranked proposed table 345). If the ranking of the first path and the ranking of the second path are in the same relative order, the proposed cost changes may be deemed acceptable. If the ranking of the first path and the ranking of the second path are not in the same relative order ranking comparator 310 may flag the routing pairs, as indicated by reference number 350. The flag may be used to initiate further processing by latency monitor 315 and/or priority classifier 320.

Latency monitor 315 may include hardware or a combination of hardware and software to identify potential latency issues in routing pairs flagged by ranking comparator 310. In one implementation, latency monitor 315 may identify instances where proposed cost changes fail to provide latency improvements. For example, for each set of routing pairs flagged by ranking comparator 310 (e.g., the first path and second path described above), latency monitor 315 may identify instances where the higher ranking (e.g., smaller ordinal number) routing pair (e.g., as ranked in ranked proposed table 345) has a greater delay (e.g., in field 450 of ranked proposed table 345) than the delay in the lower ranking (e.g., larger ordinal number) routing pair. If the higher ranking (smaller ordinal) routing pair has a greater delay than the delay in the lower ranking (larger ordinal) routing pair, latency monitor 315 may flag the routing pairs. In one implementation, latency monitor 315 may also calculate the delay difference (e.g., between the routing pair delay as indicated in field 450 of ranked proposed table 345 and ranked original table 340, respectively). Latency monitor 315 may generate a flag and/or information indicating the amount of delay increase, as indicated by reference number 355. Latency monitor 315 may forward flagged delay increase 355 to report generator 325.

Priority classifier 320 may include hardware or a combination of hardware and software to categorize identified ranking changes based on geographic impact. For example, priority classifier 320 may receive a flagged routing pair for each set of routing pairs flagged by ranking comparator 310 (e.g., the first path and second path described above). Priority classifier 320 may compare the geographic information of the first path in fields 460-490 of ranked original table 340 with the geographic information of the second path in fields 460-490 of ranked proposed table 345. Priority classifier 320 may assign priorities, for example, based on changes to a geographical area of a regions, counties, state, cities associated with "to" nodes (e.g., in fields 460-490) of the two paths.

Report generator 325 may include hardware or a combination of hardware and software to determine recommended cost changes to restore priority ranking and generate a data structure of change information. Report generator 325 may calculate cost changes, between two particular paths, required to restore the two particular paths to an original priority order (e.g., respective to each other). Report generator may include information from ranking module 305, ranking comparator 310, latency monitor 315, and priority classifier 320 to generate a report (e.g., a sortable, searchable data structure) to allow network engineers to quickly identity how proposed cost changes impact route preferences within the network.

Figure 5C:
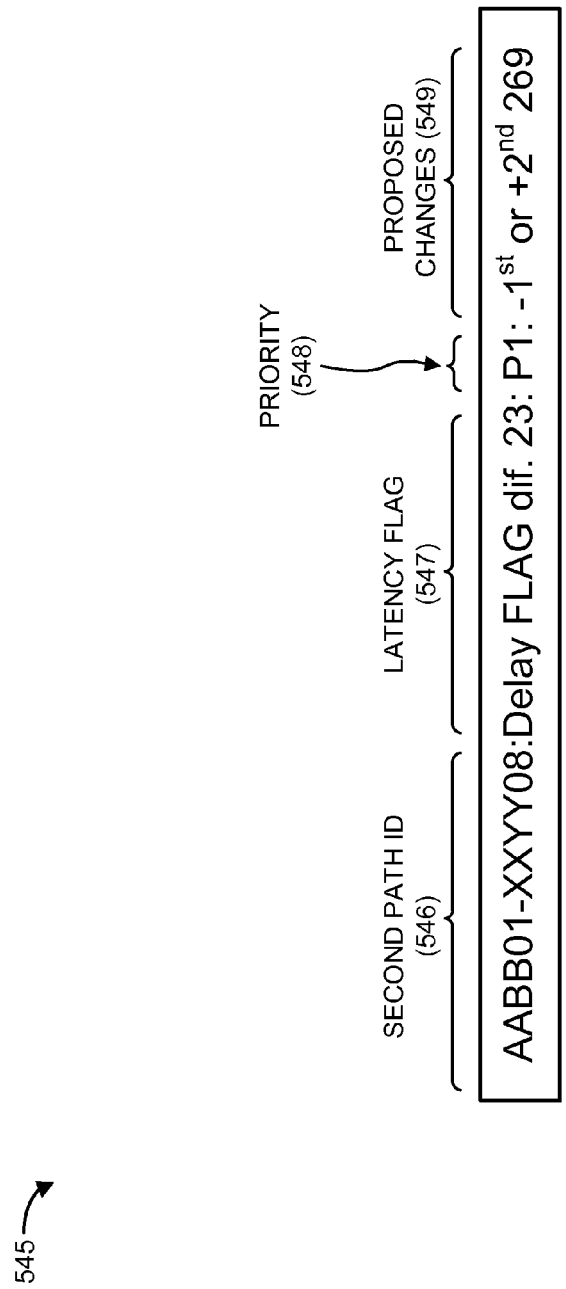

Operations of report generator 325 in conjunction with ranking comparator 310, latency monitor 315, and priority classifier 320 are described further in connection with FIGS. 5A-5C. FIGS. 5A and 5B depict a portion of a data structure 500 that is capable of being generated by report generator 325. FIG. 5C provides a more detailed view of a portion of FIG. 5B. Data structure 500 may include a rank status field 505, "from" node field 420, "to" node field 430, a rank after field 510, ranks before field 515, cost after field 520, delay field 450, "to" city priority field 525, "to" state priority field 530, "to" country priority field 535, "to" region priority field 540, recommendation field 545, and a variety of records or entries 550 associated with fields 420-545. Each row of data structure 500 may correspond to a separate routing pair within network 105.

"From" node field 420, "to" node field 430, and delay field 450 may include information described above in connection with FIG. 4. Rank status field 505 may include a status (e.g., "Flag" for changed or "OK" for unchanged) to indicate if the priority ranking of the routing pair changed after applying the proposed cost changes. Although entries in rank status field 505 include both a changed and unchanged entry, in some implementations, report generator 325 may include only routing pairs with changed (flagged) entries in rank status field 505.

Rank after field 510 may include an ordinal rank from field 410 (for a routing pair defined in corresponding fields 420 and 430) of ranked proposed table 345. Rank before field 515 may include an ordinal rank from field 410 (for a routing pair defined in corresponding fields 420 and 430) of ranked original table 340. Cost after field 520 may include a proposed cost/metric for the corresponding routing pair from cost field 440 of proposed table 345.

P4—"to" city priority field 525 may include a city (e.g., "St. Louis") associated with the geographic location of a corresponding edge node (e.g., in "to" node field 430) of the routing pair. P3—"to" state priority field 530 may include a state (e.g., "MO") associated with the geographic location of a corresponding node (e.g., in "to" node field 430) of the routing pair. P2—"to" country priority field 535 may include a country (e.g., "US") associated with the geographic location of a corresponding node (e.g., in "to" node field 430) of the routing pair. P1—"to" region priority field 540 may include a region (e.g., "NORAM") associated with the geographic location of a corresponding node (e.g., in "to" node field 430) of the routing pair.

Recommendation field 545 may include multiple types of information to compare a first path (e.g., as defined in corresponding fields 420 and 430) with the second path for which ranking comparator 310 identified a change in rank order. Report generator 325 may produce more than one recommendation field 545 for each first path, depending upon how many second paths were identified (e.g., by ranking comparator 310) that changed rank order with a particular first path. FIG. 5C provides a format of an exemplary recommendation field 545. Generally, recommendation field 545 may include a second path identifier section 546, a latency flag section 547, a priority section 548, and a proposed changes section 549.

Second path identifier section 546 may include an identifier for the path (e.g., the second path) to which the first path routing pair was compared (e.g., as defined in corresponding fields 420 and 430). For example, a first path may be defined by "from" node field 420 entry AABB01 (e.g., corresponding to node 110-1 of FIG. 1) and "to" node field 430 entry AABB04 (e.g., corresponding to node 110-10 of FIG. 1). A second path, shown in FIG. 5C, may be defined the same "from" node AABB01 (e.g., corresponding to node 110-1 of FIG. 1) and a different "to" node XXYY08 (e.g., corresponding to node 110-11 of FIG. 1).

Latency flag section 547 may include a latency indicator (e.g., as determined by latency monitor 315 and provided by flag delay increase 355). Latency flag section 547 may include a flag (e.g., FLAG") to indicate that an increase was detected and and/or information indicating the amount of the delay increase in milliseconds (e.g., "23").

Priority section 548 may include an indicator of the geographic magnitude of a change between the "to" node of the first path (e.g., in field 430) and the "to" node of the second path (e.g., in second path identifier section 546). For example, if only the "to" city of the second path differs from the city in "to" city priority field 525, report generator 325 may enter a P4 in priority section 548. If the "to" state of the second path differs from the state in "to" state priority field 530, report generator 325 may enter a P3 in priority section 548. If the "to" country of the second path differs from the country in "to" country priority field 535 report generator may enter a P2 in priority section 548. If the "to" region of the second path differs from the region in "to" region priority field 540, report generator 325 may enter a P1 in priority section 548. If there are no differences between the geographic indicators of second path "to" node and the first path "to" node, report generator 325 may enter a P5 in priority section 548.

Proposed changes section 549 may include a proposed cost change value needed to return the first path and the second path to the original priority rank order. For example, the proposed cost change may include a reduction to the cost (e.g., in cost field 440) of the first path routing pair (e.g., "$-1^{st}$ ... 269") or an increase to the cost of the second path routing pair (e.g., "$+2^{nd}$ 269").

Although FIGS. 5A-5C show example information that may be provided in data structure 500, in other implementations, data structure 500 may contain less, different, differently arranged, or additional information than depicted in FIGS. 5A-5C. For example, data structure 500 may take the form of a spreadsheet, a database, a flat data structure, etc.

Returning to FIG. 3, in practice, ranking comparator 310 may iteratively compare each "first path" with every "second path" in network 105 to identify priority rank changes (e.g., resulting from proposed cost changes) for every path. Latency monitor 315 and priority classifier 320 may flag/classify each rank order change identified by ranking comparator 310 and provide results to report generator 325. Report generator 325 may compile all priority rank changes (e.g., with corresponding flags, classifications, and recommendations) in a single data structure.

Although FIG. 3 shows exemplary functional components of management terminal 115, in other implementations, management terminal 115 may contain fewer functional components, different functional components, differently arranged functional components, or additional functional components than depicted in FIG. 3. In still other implementations, one or more functional components of management terminal 115 may perform one or more other tasks described as being performed by one or more other functional components of management terminal 115.

Figure 6:
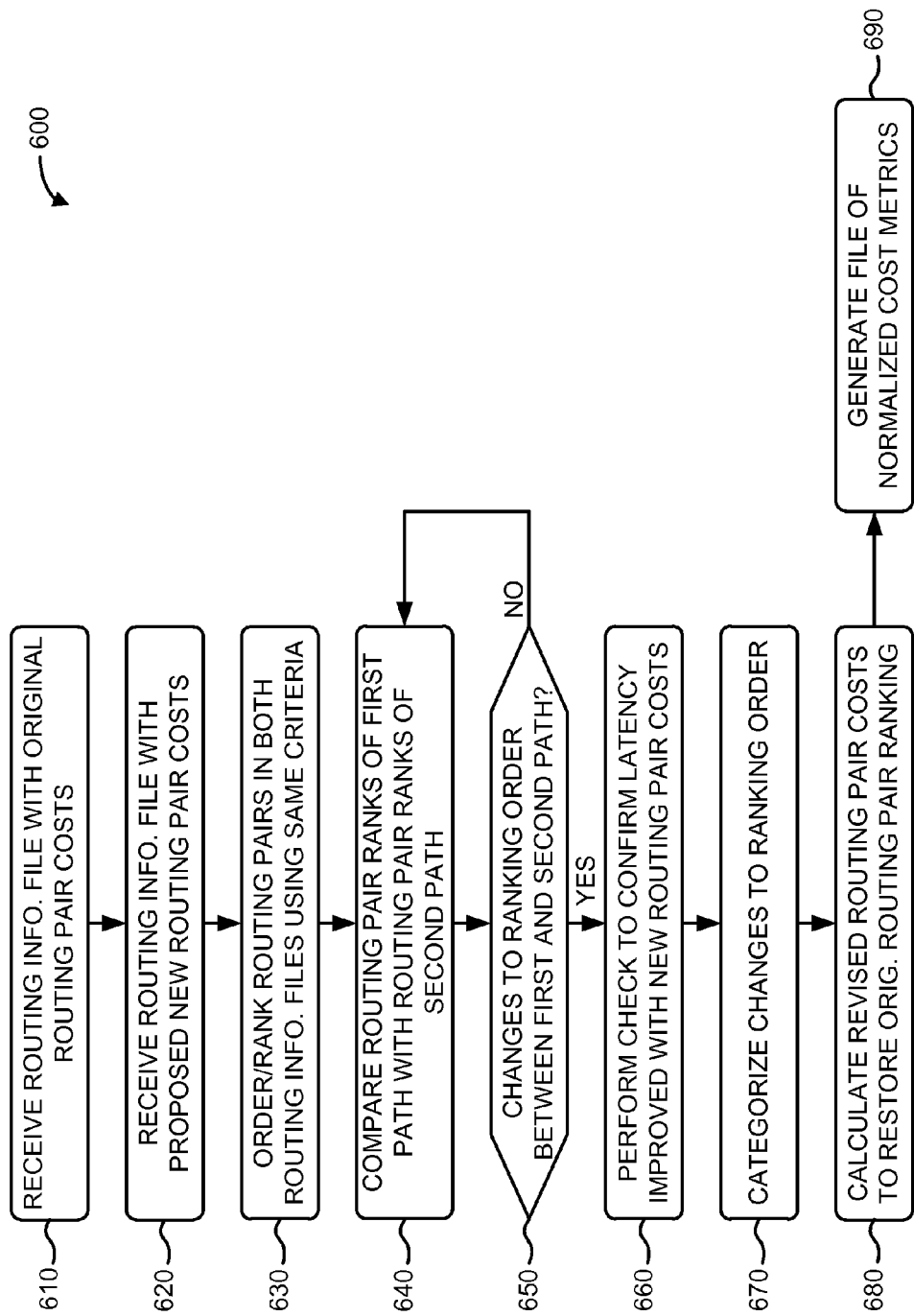
FIGS. 6-9 show an exemplary process for normalizing proposed cost metrics for routing pairs according to an implementation described herein.

FIG. 6 is a diagram illustrating an exemplary process 600 for normalizing proposed cost metrics for routing pairs according to an implementation described herein. Process 600 may be performed by one or more components of management terminal 115. In other implementations, process 600 may be performed by another device or group of devices including or excluding management terminal 115.

Process 600 may include receiving a routing information file with original routing pair costs (block 610) and receiving a routing information file with original routing pair costs (block 620). For example, management terminal 115 (e.g., ranking module 305) may receive routing information file 330 for an original network configuration (e.g., with current edge node-to-edge node costs) and routing information file 335 for a proposed configuration (e.g., with new edge node-to-edge node costs). Routing information files 330/335 may include data from routing tables and other network modeling information that can be used to evaluate network performance.

Process 600 may include ordering/ranking the routing pairs in both routing information files using the same criteria (block 630). For example, management terminal 115 (e.g., ranking module 305) may separately sort and rank routing pairs within each of routing information file 330 and routing information file 335. For example, ranking module 305 may identify and/or extract relevant fields from routing information file 330, sort the routing pairs based on particular criteria, and rank each routing pair of the sorted routing table information 330. Similarly, ranking module 305 may identify and/or extract relevant fields from routing information file 335, sort the routing pairs based on the same particular criteria used for routing information file 330, and rank each routing pair of the sorted routing information file 335. In one implementation, ranking module 305 may first sort routing pairs alphabetically (e.g., from A to Z) by entries in "from" node field 420; then sort the routing pairs numerically (e.g., from smallest to largest value) by entries in cost field 440; then sort the routing pairs alphabetically (e.g., from A to Z) by entries in "to" node field 430. After sorting, ranking module 305 may assign a rank value (e.g., in rank field 410) for each corresponding routing pair.

Process 600 may include comparing routing pair ranks of a first path with routing pair ranks of a second path (block 640) and determining if there are changes to the ranking order between the first path and the second path (block 650). For example, management terminal 115 (e.g., ranking comparator 310) may compare a first path between a particular "from" node and a particular "to" node to second path between the same "from" node and a different "to" node. Ranking comparator 310 may determine if the ranking of the first path and the ranking of the second path are in the same relative order before and after the proposed cost changes (e.g., based on a comparison of ranked original table 340 and ranked proposed table 345). If the ranking of the first path and the ranking of the second path are not in the same relative order ranking comparator 310 may flag the routing pairs, as indicated by reference number 350. The flag may be used to initiate further processing by latency monitor 315 and/or priority classifier 320.

If there are not changes to the rank order between the first path the second path (block 650—NO), process 600 may return to block 640 to perform another comparison. For example, if management terminal 115 (e.g., ranking comparator 310) concludes that the ranking of the first path and the ranking of the second path are in the same relative order, the proposed cost changes to the routing pair may be deemed acceptable.

If there are changes to the rank order between the first path the second path (block 650—YES), process 600 may include performing a check to confirm that latency improved with the new routing pair costs (block 660). For example, management terminal 115 (e.g., latency monitor 315) may identify instances where, between a first path and second path, a higher ranking (lower ordinal) routing pair (e.g., as ranked in ranked proposed table 345) has a greater delay (e.g., in field 450 of ranked proposed table 345) than the delay in the lower ranking (higher ordinal) routing pair.

Process 600 may include categorizing the identified changes to the ranking order (block 670). For example, management terminal 115 (e.g., priority classifier 320) may receive a flagged routing pair (e.g., flagged routing pairs with ranking difference 350) for each set of routing pairs flagged by ranking comparator 310 (e.g., the first path and second path described above). Priority classifier 320 may compare the geographic information of the first path "to" node with the geographic information of the second path "to" nodes. Priority classifier 320 may assign priorities, for example, based on differences between regions, counties, state, cities associated with "to" nodes (e.g., in fields 460-490) of the two paths.

Process 600 may include calculating revised routing pair costs to restore the original routing pair ranking (block 680), and generating a file of normalized cost metrics (block 690). For example, management terminal 115 (e.g., report generator 325) may determine recommended cost changes to restore priority ranking and generate a data structure of change information. Report generator 325 may calculate cost changes, between two particular paths, required to restore the two particular paths to an original priority order (e.g., respective to each other). Report generator may include information from ranking module 305, ranking comparator 310, latency monitor 315, and priority classifier 320 to generate a report (e.g., a sortable, searchable data structure) to allow network engineers to quickly identity how proposed cost changes impact route preferences within the network.

Figure 7:
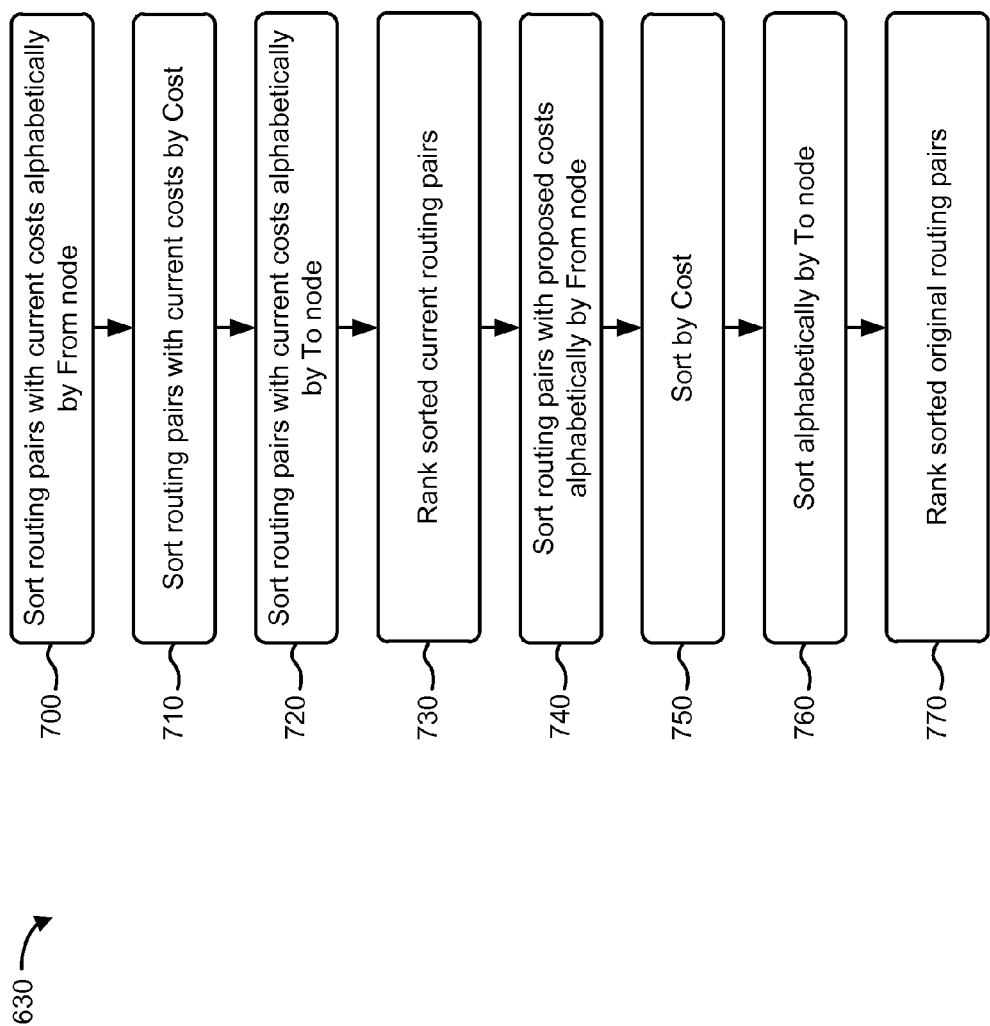

Process block 630 may include the process blocks shown in FIG. 7. Referring to FIG. 7, process 630 may include sorting the routing pairs with current costs alphabetically based on a name of an entry point node (block 700), sorting the routing pairs with current costs numerically based on an assigned routing pair weight (block 710), sorting the routing pairs with current costs alphabetically based on a name of an exit point node (block 720), and assigning an ordinal rank to the sorted routing pairs with current costs (block 730). For example, as described above in connection with FIGS. 3 and 4, using original routing information file 330, management terminal 115 (e.g., ranking module 305) may sort routing pairs (which may include corresponding other information in fields 440-490) alphabetically (e.g., from A to Z) by entries in "from" node field 420. Ranking module 305 may then sort the routing pairs numerically (e.g., from smallest to largest value) by entries in cost field 440. Ranking module 305 may next sort the routing pairs alphabetically (e.g., from A to Z) by entries in "to" node field 430. After sorting, ranking module 305 may assign a rank value (e.g., in rank field 410) for each corresponding routing pair to generate ranked original table 340.

Process block 630 may also include sorting the routing pairs with proposed costs alphabetically based on a name of an entry point node (block 740), sorting the routing pairs with proposed costs numerically based on an assigned routing pair weight (block 750), sorting the routing pairs with proposed costs alphabetically based on a name of an exit point node (block 760), and assigning an ordinal rank to the sorted routing pairs with proposed costs (block 770). For example, using proposed routing information file 335, management terminal 115 (e.g., ranking module 305) may sort routing pairs (which may include corresponding other information in fields 440-490) alphabetically (e.g., from A to Z) by entries in "from" node field 420. Ranking module 305 may then sort the routing pairs numerically (e.g., from smallest to largest value) by entries in cost field 440. Ranking module 305 may next sort the routing pairs alphabetically (e.g., from A to Z) by entries in "to" node field 430. After sorting, ranking module 305 may assign a rank value (e.g., in rank field 410) for each corresponding routing pair to generate ranked proposed table 345.

Figure 8:
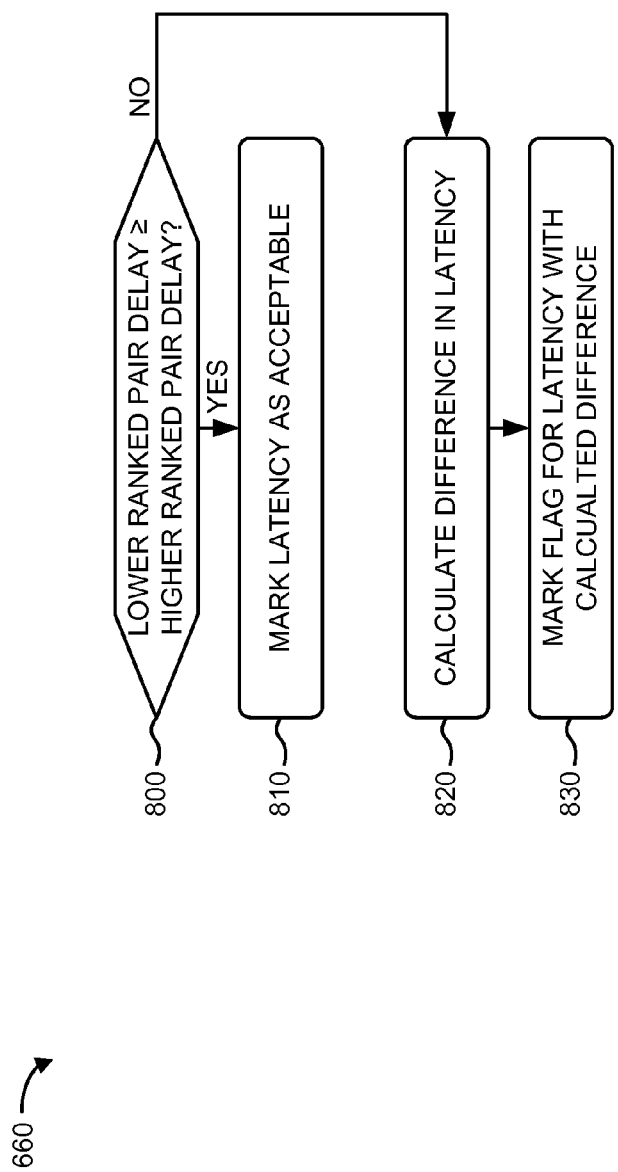

Process block 660 may include the process blocks shown in FIG. 8. Referring to FIG. 8, process 660 may include determining if a lower ranked routing pair has a longer or equal delay than a higher ranked routing pair (block 800). For example, between a first path and a second path, management terminal 115 (e.g., latency monitor 315) may determine if the lower ranking (larger ordinal) routing pair has a delay greater than or equal to the delay in the higher ranking (smaller ordinal) routing pair.

If the lower ranked routing pair has a longer or equal delay than the higher ranked routing pair (block 800—YES), the latency may be marked as acceptable (block 810). For example, if the proposed cost changes (e.g., of proposed routing information file 335) make a path with a shorter (or equal) delay preferred over a path with a longer delay, latency monitor 315 may not take any action.

If the lower ranked routing pair has a shorter delay than the higher ranked routing pair path (block 800—NO), process block 660 may include calculating the difference in latency (block 820) and marking a flag for latency with the calculated difference (block 830). For example, if the proposed cost changes make a path with a longer delay preferred over a path with a shorter delay, latency monitor 315 may calculate the difference (e.g., increase) in delay between the first path and the second path. Latency monitor 315 may generate a flag and/or information indicating the amount of delay increase, as indicated by reference number 355.

Figure 9:
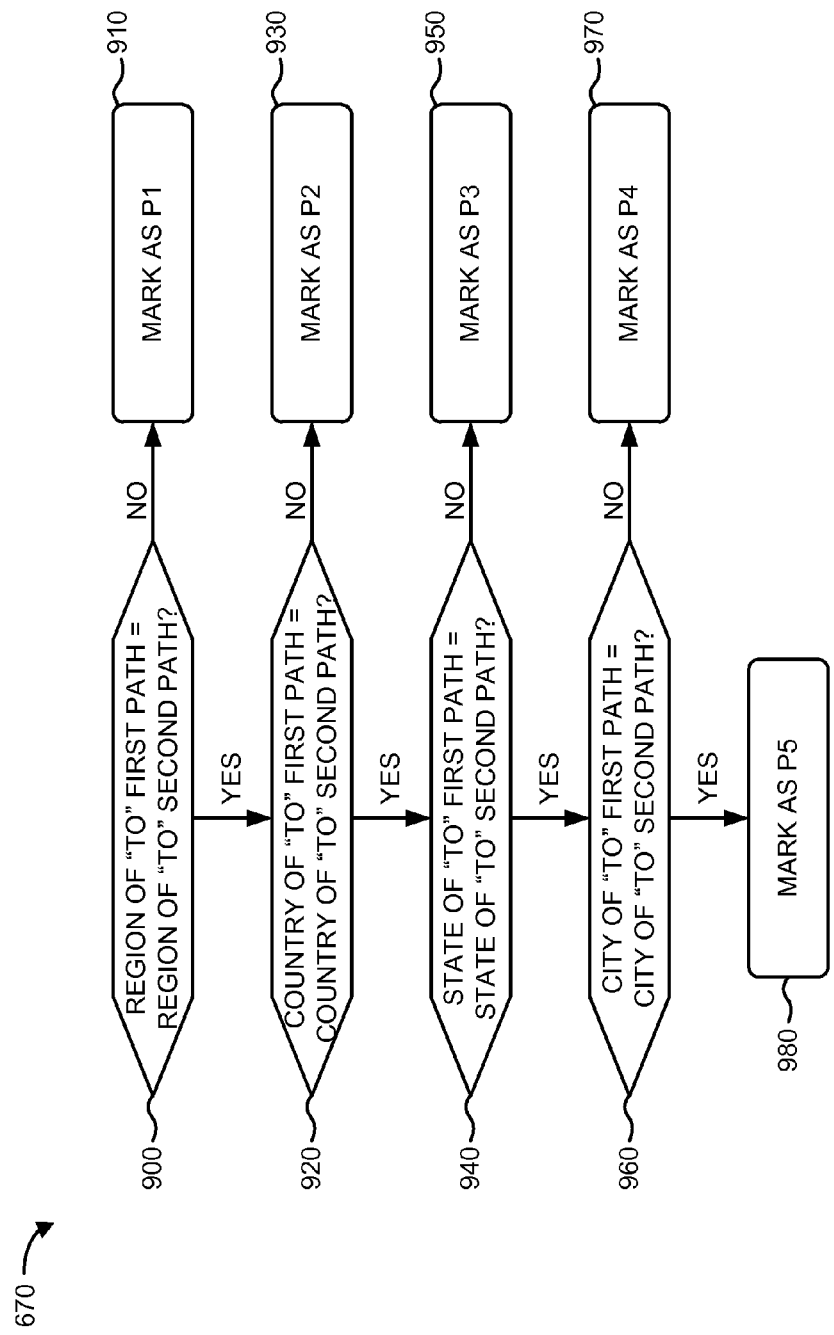

Process block 670 may include the process blocks shown in FIG. 9. Referring to FIG. 9, process 670 may include determining if the region of the "to" node in the first path matches the region of the "to" node in the second path (block 900). If the regions do not match (block 900—NO), the change may be marked as P1 (block 910). For example, if a first path with a "to" node in North America changes priority rank with a "to" node in Europe, the change may be marked (e.g., in field 540 for the first path routing pair) as highest priority (P1).

If the regions match (block 900—YES), process 670 may include determining if the county of the "to" node in the first path matches the county of the "to" node in the second path (block 920). If the countries do not match (block 920—NO), the change may be marked as P2 (block 930). For example, if a first path with a "to" node in Mexico changes priority rank with a "to" node in the United States, the change may be marked (e.g., in field 540 for the first path routing pair) as a second highest priority (P2).

If the countries match (block 920—YES), process 670 may include determining if the state of the "to" node in the first path matches the state of the "to" node in the second path (block 940). If the states do not match (block 940—NO), the change may be marked as P3 (block 950). For example, if a first path with a "to" node in California changes priority rank with a "to" node in New York, the change may be marked (e.g., in field 540 for the first path routing pair) as a third highest priority (P3).

If the states match (block 940—YES), process 670 may include determining if the city of the "to" node in the first path matches the city of the "to" node in the second path (block 960). If the cities do not match (block 960—NO), the change may be marked as P4 (block 970). For example, if a first path with a "to" node in New York changes priority rank with a "to" node in Albany, the change may be marked (e.g., in field 540 for the first path routing pair) as a fourth highest priority (P4).

If the cities match (block 960—YES), process 670 may include marking the change as P5 (block 980). For example, changes in priority rank between a first path and a second path result in no changes to any of the region, country, state, or city of the "to" nodes for the paths, the change may be marked (e.g., in field 540 for the first path routing pair) as a lowest priority (P5).

As described above, systems and/or methods may rank multiple routing pairs based on a current routing configuration for weighted links in a mesh network, and may rank the multiple routing pairs based on a proposed routing configuration, different than the current routing configuration, for the weighted links in the mesh network. The systems and/or methods may compare a current rank order of a first routing pair and a second routing pair in the multiple routing pairs with a proposed rank order of the first routing pair and the second routing pair. The systems and/or methods may identify a change between the current rank order and the proposed rank order and may generate a data structure that indicates the identified change between the current rank order and the proposed rank order for the first routing pair and the second routing pair. The system and/or methods may also assign priorities to identified changes in rank orders, may perform a check to confirm latency improvements in the proposed routing information file, and/or may calculate changes to the proposed routing pair costs to maintain the rank order of the original routing information file.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIG. 6-9, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device, first routing information including multiple routing pairs and current weights for each of the multiple routing pairs;
   receiving, by the computing device, second routing information including the multiple routing pairs and proposed new weights for each of the multiple routing pairs;
   ranking, by the computing device, the first routing information based on particular criteria;
   ranking, by the computing device, the second routing information based on the particular criteria;
   comparing, by the computing device, a rank order between a first routing pair of the multiple routing pairs and a second routing pair of the multiple routing pairs using the first routing information and a rank order between the first routing pair and the second routing pair using the second routing information;
   identifying, by the computing device, a change from the rank order between the first routing pair and the second routing pair using the first routing information to the rank order between the first routing pair and the second routing pair using the second routing information; and
   generating, by the computing device, a data structure that indicates the change in the rank order.

2. The method of claim 1, wherein the first routing information and the second routing information include geographical information of each node in each routing pair, the method further comprising:
   assigning a category to the change in the rank order based on differences in a type of geographic information between a node in the first routing pair and a node in the second routing pair.

3. The method of claim 2, wherein the type of geographic information includes:
   a city,
   a state,
   a country, or
   a region.

4. The method of claim 1, further comprising:
   calculating a revised weight, for the second information, of the first routing pair or the second routing pair, wherein the revised weight restores the first routing pair and the second routing pair to the rank order between the first routing pair and the second routing pair of the first routing information.

5. The method of claim 1, further comprising:
   comparing a delay associated with the first routing pair and a delay associated with the second routing pair; and
   indicating, in the data structure, when a delay associated with a higher ranked of the first routing pair or the second routing pair, using the second information, is larger than a delay associated with the lower ranked of the first routing pair or the second routing pair, using the second information.

6. The method of claim 5, further comprising:
   indicating, in the data structure, the difference in delay between the higher ranked of the first routing pair or the second routing pair and the lower ranked of the first routing pair or the second routing pair.

7. The method of claim 1, wherein the first routing pair and the second routing pair include a same edge node.

8. The method of claim 1, wherein ranking the first routing information and ranking the second routing information both include:
   sorting the routing pairs alphabetically based on a name of an entry point node,
   sorting the routing pairs numerically based on an assigned routing pair weight,
   sorting the routing pairs alphabetically based on a name of an exit point node, and
   assigning an ordinal rank to the sorted routing pairs.

9. The method of claim 1, wherein the multiple routing pairs include nodes for an Internet Protocol (IP) or a multi-protocol label switching (MPLS) network.

10. A device comprising:
    a memory to store a plurality of instructions;
    a processor to execute instructions in the memory to:
       rank multiple routing pairs based on a current routing configuration for weighted links in a network,
       rank the multiple routing pairs based on a proposed routing configuration, different than the current routing configuration, for the weighted links in the network,
       compare a current rank order of a first routing pair and a second routing pair of the multiple routing pairs using the current routing configuration with a proposed rank order of the first routing pair and the second routing pair of the multiple routing pairs using the proposed routing configuration,
       identify a change between the current rank order and the proposed rank order for the first routing pair and the second routing pair, and
       generate a data structure that indicates the identified change between the current rank order and the proposed rank order for the first routing pair and the second routing pair.

11. The device of claim 10, wherein the processor is further configured to execute instructions in the memory to:
    assign a category to the identified change between the current rank order and the proposed rank order based on differences in a type of geographic information associated with nodes in the first routing pair and the second routing pair.

12. The network device of claim 10, wherein the processor is further configured to execute instructions in the memory to:
    calculate a revised weight for a one of the first routing pair or the second routing pair in the proposed routing configuration, wherein the revised weight would conform the first routing pair and the second routing pair to the rank order based on the current routing configuration.

13. The network device of claim 10, wherein the processor is further configured to execute instructions in the memory to:

compare a delay associated with the first routing pair and a delay associated with the second routing pair, and use the proposed routing configuration to determine when the delay associated with a higher ranked of the first routing pair or the second routing pair is larger than the delay associated with the lower ranked of the first routing pair or the second routing pair.

14. The network device of claim 13, wherein the processor is further configured to execute instructions in the memory to:
indicate, in the data structure, an amount of difference in the delay associated with a higher ranked of the first routing pair or the second routing pair is larger than the delay associated with the lower ranked of the first routing pair or the second routing pair.

15. The network device of claim 10, wherein the first routing pair and the second routing pair include a common edge node.

16. The network device of claim 10, where, when rank multiple routing pairs based on a current routing configuration for weighted links in a network, the processor is further configured to execute instructions in the memory to:
sort the multiple routing pairs alphabetically based on a name of an entry point node,
sort the multiple routing pairs numerically based on an assigned routing pair weight,
sort the multiple routing pairs alphabetically based on a name of an exit point node, and
assign an ordinal rank to the sorted multiple routing pairs.

17. The network device of claim 10, wherein the processor is further to execute instructions in the memory to
compare a current rank order of the first routing pair and a third routing pair of the multiple routing pairs using the current routing configuration with a proposed rank order of the first routing pair and the third routing pair of the multiple routing pairs using the proposed routing configuration,
identify a change between the current rank order and the proposed rank order for the first routing pair and the third routing pair, and
adding, to the data structure, an indication of the identified change between the current rank order and the proposed rank order for the first routing pair and the third routing pair.

18. A method comprising:
receiving, by a computing device, a current ranked listing of multiple routing pairs based on a current routing configuration for weighted links in a network;
receiving, by the computing device, a proposed ranked listing of multiple routing pairs based on a proposed routing configuration for weighted links in the network;
comparing, by the computing device, a rank order between a first routing pair of the multiple routing pairs and a second routing pair of the multiple routing pairs from the current ranked listing with a rank order between the first routing pair and the second routing pair using the proposed ranked listing;
identifying, by the computing device, a change in the rank order between the first routing pair and the second routing pair using the current ranked listing and the rank order between the first routing pair and the second routing pair using the proposed ranked listing;
assigning a priority category to the identified change in the rank order based on differences in a geographic location associated with a node in the first routing pair and a geographic location associated with a node in the second routing pair; and
generating, by the computing device, a data structure that indicates the change in the rank order and the assigned priority.

19. The method of claim 18, further comprising:
calculating a revised weight, for the second information, of the first routing pair or the second routing pair, wherein the revised weight restores the first routing pair and the second routing pair to the rank order between the first routing pair and the second routing pair of the first routing information.

20. The method of claim 19, further comprising:
comparing a delay associated with the first routing pair and a delay associated with the second routing pair; and
indicating, in the data structure, when the delay associated with a higher ranked of the first routing pair or the second routing pair, using the second information, is larger than the delay associated with the lower ranked of the first routing pair or the second routing pair, using the second information.

\* \* \* \* \*